(12) United States Patent
Czarnecki

(10) Patent No.: US 7,897,886 B1
(45) Date of Patent: Mar. 1, 2011

(54) NON-TRANSFER SWITCH FOR PROVIDING POWER FROM AN ALTERNATE POWER SOURCE IN A NON-SEPARATELY DERIVED POWER MANAGEMENT SYSTEM

(75) Inventor: Neil A. Czarnecki, Mt. Pleasant, WI (US)

(73) Assignee: Reliance Controls Corporation, Racine, WI (US)

(*) Notice: Subject to any disclaimer, the term of this patent is extended or adjusted under 35 U.S.C. 154(b) by 318 days.

(21) Appl. No.: 12/103,384

(22) Filed: Apr. 15, 2008

(51) Int. Cl.
*H01R 33/96* (2006.01)
(52) U.S. Cl. .................. 200/51.12; 200/50.28
(58) Field of Classification Search .......... 200/50.12
See application file for complete search history.

(56) References Cited

U.S. PATENT DOCUMENTS 3,644,870 A * 2/1972 Jones .................. 439/152
5,268,850 A * 12/1993 Skoglund .............. 700/297
6,096,986 A * 8/2000 Flegel .................. 200/50.33

\* cited by examiner

*Primary Examiner*—Renee S Luebke
*Assistant Examiner*—Lisa Klaus
(74) *Attorney, Agent, or Firm*—Boyle Fredrickson, S.C.

(57) ABSTRACT

A manually operated transfer-type switch has an electrically interlocked isolating plug and plugboard arrangement to isolate two power supplies, e.g., utility and electric generator, from one another. The switch functions to connect electrical loads with either the utility or generator power supply without performing making and breaking of current. The plug is engaged with the plugboard in a first position for supplying utility power and in a second position for providing generator power. A locking arrangement prevents the disengagement of the plug from the plugboard when power is supplied from either the utility or from the generator.

21 Claims, 5 Drawing Sheets

NON-TRANSFER SWITCH FOR PROVIDING POWER FROM AN ALTERNATE POWER SOURCE IN A NON-SEPARATELY DERIVED POWER MANAGEMENT SYSTEM

FIELD OF THE INVENTION

This invention relates to a switch of the type that is adapted to be interconnected with an auxiliary power supply, such as an electrical generator, for controlling the supply of electrical power from the generator to branch electrical circuits in an electrical load center. More particularly, the invention relates to a transfer switch having an electrically interlocked isolating plug and plugboard arrangement to isolate two power supplies from one another without performing making and breaking of current functions.

BACKGROUND OF THE INVENTION

A building, such as a home or other dwelling, typically includes critical and non-critical loads to the primary power supply of the building, which is generally a utility power supply. The critical loads for a home, for instance, may include the HVAC system, sump pump, refrigerators, freezers, dishwasher, washer/dryer, and life-sustaining medical equipment. Other loads of the home are generally considered non-critical. The non-critical loads are generally connected to non-critical branches that are hardwired to a load center, and the critical loads may be connected to critical branches that are hardwired to a separate subpanel; both of which are powered by the primary power supply during normal operation.

To ensure power to the critical loads during primary power supply failure or interruption, it is known to connect the subpanel and, thus, the critical loads (or at least the branches that feed those loads), to an auxiliary power supply, such as an electrical generator, using a transfer switch. Many prior art transfer switches are manually operated. With transfer switches of this type, the operator initiates operation of an auxiliary power supply, such as an electrical generator, and connects the auxiliary power supply to the transfer switch, unless there is a permanent connection between the generator and the transfer switch. The individual switches or circuit breakers of the transfer switch are then actuated to supply power from the auxiliary power supply to the circuits in which the individual switches are connected.

Conventional transfer switches use classical switching devices, such as double-throw switches or relays, linked single-throw switches or circuit breakers, linked contactors or relays, semiconductors (triacs, IGBTs, etc.), and the like. These classical switching devices perform two general functions: isolation and current making/breaking. In the case of the former, these classical devices electrically isolate the primary power supply and the auxiliary power supply from one another. This is critical to prevent backfeeding of power. Regarding the latter, when energizing a load, the switch for that load (or at least the branch to which that load is connected) must be moved from an OFF position to an ON position. When moved to the ON position, a classical switching device will close the circuit between the load and the power supply. Thus, when the switching device is moved to the ON position when there is a voltage across the switching device, the switching device will "make" current. Similarly, a classical switching device may be moved from the ON position to the OFF position to open the circuit between the load and the power supply and thereby "break" current. Such a classical device may perform this current breaking in response to a manually throwing of the device or may include an overload feature so that the device is "tripped" or automatically thrown to the OFF position when an undesirable current condition is detected.

Despite their widespread use, conventional transfer switches fall within this single class or type thereby reducing consumer choices and variability in designing a power management system for a building, home, or other dwelling.

SUMMARY OF THE INVENTION

The present invention is directed to a new class or type of switch for accomplishing a transfer-type function in order to supply power to selected circuits from an auxiliary power source. In particular, the present invention contemplates a switch that utilizes an electrically interlocked and isolating plug and plugboard arrangement to isolate two power sources from one another, but does not require the arrangement to make or break full-rated current. The switch uses an isolating plug and plugboard arrangement to selectively connect loads to a primary power supply or an auxiliary power supply. A solenoid is powered by either the primary power supply or the auxiliary power supply, and when energized actuates a locking feature to lock the isolating plug in the plugboard when power is being delivered to the switch. When neither the auxiliary power supply nor the primary power supply is delivering power to the switch, the isolating plug may be removed from the plugboard.

The isolating plug may be engaged with the plugboard in two different positions. In one position, the isolating plug electrically connects a load to the primary power supply. In the other position, the isolating plug electrically connects the load to the auxiliary power supply. The plugboard has two sets of sockets that receive prongs of the isolating plug. When the isolating plug is seated at the primary power position, one set of sockets receive the prongs of the isolating plug. When the isolating plug is seated in the auxiliary power position, the other set of sockets receive the prongs of the isolating plug.

In normal operation, the isolating plug is seated in the plugboard at the primary power position so that the loads of the switch are normally powered by the primary power supply. However, when the primary power fails or is otherwise interrupted, the loads will not be powered and must be connected to the auxiliary power supply to restore their operation. When the primary power is lost, the isolating plug is no longer locked in the plugboard. Thus, the isolating plug may be removed manually and reinserted at the auxiliary power position. Specifically, to connect the switch to auxiliary power, the isolating plug is rotated 180 degrees from its primary power position and then reinserted into the plugboard.

The auxiliary or backup power supply may then be energized and auxiliary-side breakers may be thrown to energize the loads with auxiliary power. When the auxiliary power source is operating, the isolating plug is locked into the plugboard. When primary power is restored, both power supplies will be operative. As such, the auxiliary power supply should then be shut-down, i.e., disconnected from the switch, which causes unlocking of the isolating plug. The isolating plug may be extracted from the plugboard, rotated to the primary power position, and reinserted into the plugboard. Thereafter, the primary power is reconnected to the switch, which causes primary power to not only be delivered to the loads, but also locks the isolating plug into the plugboard.

In one embodiment, the isolating plug and the plugboard sockets are made of non make-and-break current material, such as brass, since the isolating plug and plugboard arrangement does not make or break current.

Therefore, in accordance with one aspect, the present disclosure is directed to a transfer-type switch having a first power input connected to a first power supply and a second power input connected to a second power supply. The switch also has an interlock assembly positioned between the first and second power inputs and that electrically isolates the first power supply and the second power supply from one another without performing making and breaking of current functions.

In accordance with another aspect of the present disclosure, a transfer-type switch is disclosed and includes a plugboard and removable plug. The plugboard and plug are constructed such that insertion of the plug in the plugboard in a first position connects a load to a first power supply and insertion of the plug in the plugboard in a second position connects the load to a second power supply. A powered actuating device, such as a solenoid, is coupled to a locking feature and is used to bias the locking feature so as to lock the plug in the plugboard, when the plug is fully inserted into the plugboard.

According to a further aspect, the present disclosure is directed to a power management system having a first switch that detects a current overload between a utility power supply and a load center when the load center is connected to the utility power supply through the first switch, and a second switch that detects current overload between an electric generator and the load center when the load center is connected to the electrical generator through the second switch. The power management system further has a manual transfer-type switch that connects the load center to the utility power supply when in a first position and connects the load center to the electrical generator when in a second position. The manual transfer-type switch however does not detect current overload when in either the first position or the second position.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
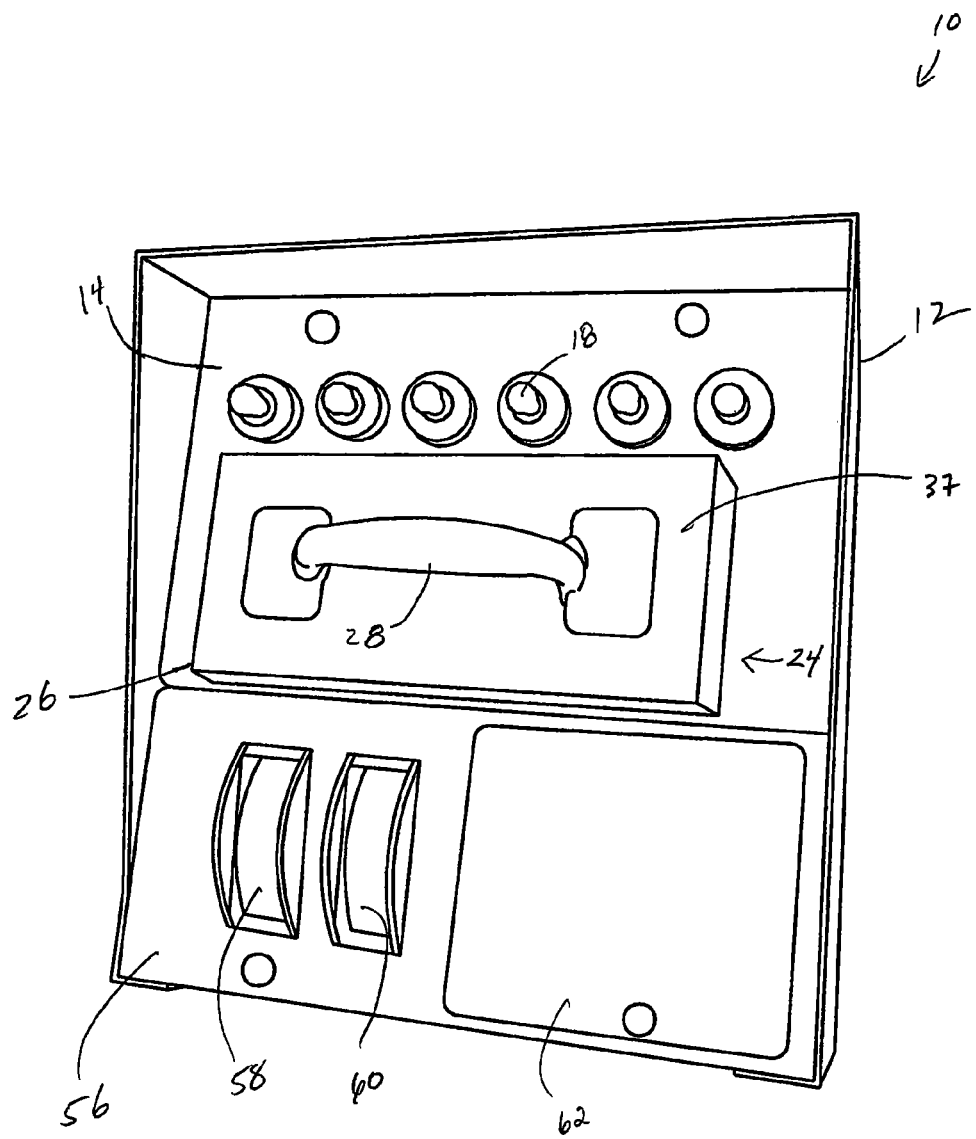
FIG. 1 is an isometric view of a manual transfer-type switch having a plug and plugboard arrangement with the plug seated in the plugboard according to one aspect of the present invention.
Figure 2:
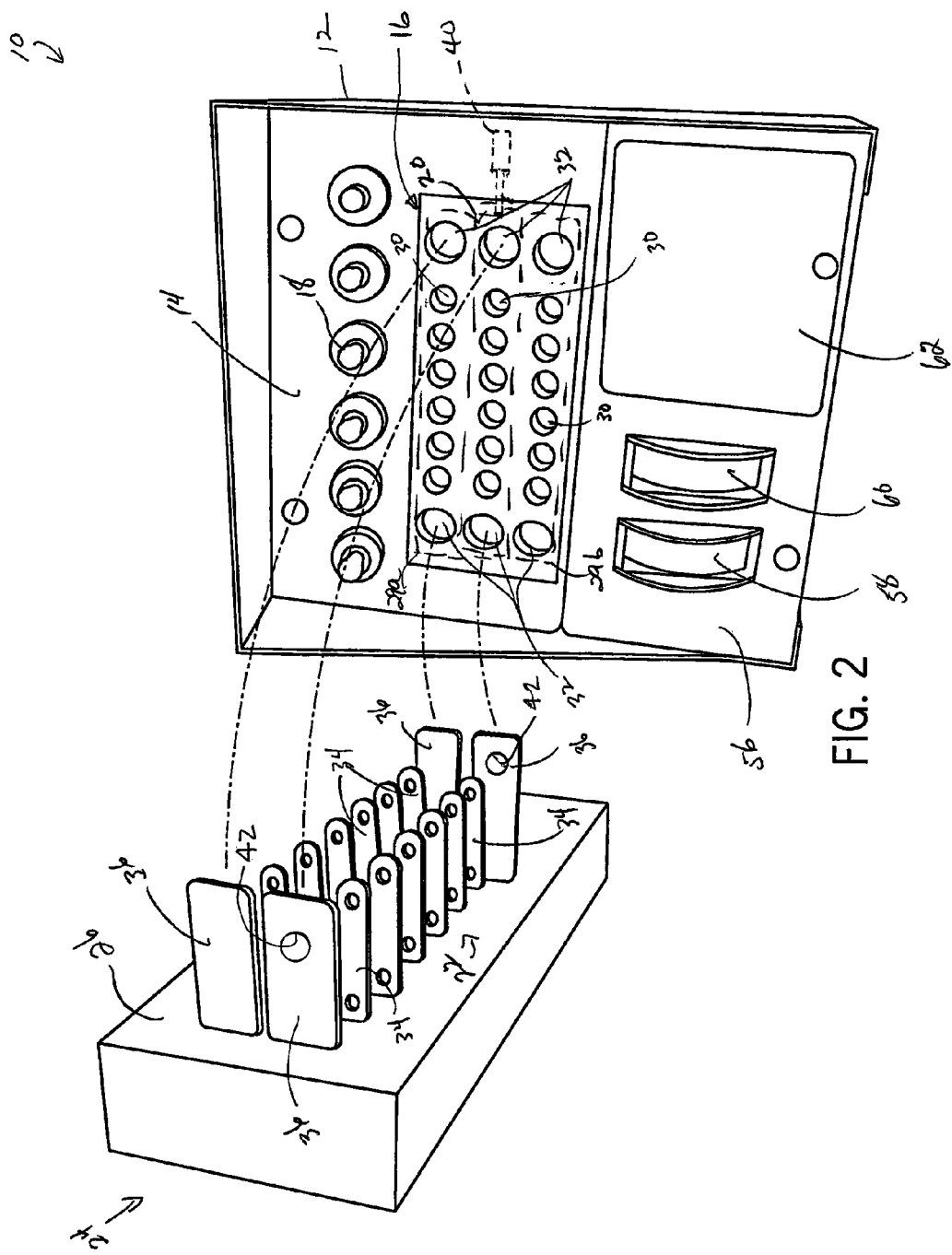
FIG. 2 is an isometric view of the manual transfer-type switch shown in FIG. 1 with the plug removed from the plugboard.

FIGS. 1-2 illustrate a manual transfer-type switch 10 according to one embodiment of the invention. For convenience, the switch 10 will be referred to as a transfer switch, although it is understood that the switch 10 functions much differently than the type of switch conventionally referred to as a transfer switch that is used to supply electrical power from an alternate power source.

The transfer switch 10 has a housing 12 that encloses circuitry, as will be described herein, to selectively connect loads to either a primary power supply, such as utility power, or an auxiliary power supply, such an electrical generator. The housing 12 includes a top faceplate 14 that supports a plugboard 16 and a series of circuit breakers 18. The plugboard 16 includes a socket arrangement 20 that receives a set of prongs 22 carried by an isolating plug 24. Specifically, the isolating plug 24 includes a block or gangway 26 to which the prongs 22 are mounted. Mounted opposite and electrically isolated from prongs 22 is a handle 28 that may be used to insert the prongs 22 into the plugboard 16 or to extract the prongs 22 from the plugboard 16.

The socket arrangement 20 is composed of two sets of sockets, shown at 29a, 29b. Each socket set 29a, 29b is composed of a series of hot sockets 30 and a series of neutral sockets 32. The neutral sockets 32 have a construction that is distinct from the hot sockets 30. Representatively, the neutral sockets 32 may each be formed to have a larger diameter than the hot sockets 30, although it is understood that any other satisfactory distinguishing construction may be used. The hot sockets 30 are each designed to receive a hot prong 34 of plug 24, whereas the neutral sockets 32 are designed to receive neutral prongs 36 of plug 24.

As shown in the figures, the isolating plug 24 has fewer prongs 22 than sockets 30, 32 of the plugboard 16. Thus, when the isolating plug 24 is seated in the plugboard 16, some of the sockets 30, 32 will not receive a prong 34, 36. Thus, in one preferred embodiment, the gangway 26 is sized such that all the sockets are covered by gangway 26 regardless the orientation of the isolating plug 24 when the isolating plug 24 is seated in the plugboard 16. Alternately, the isolating plug 24 may be equipped with dummy plugs (not shown) made of non-conductive material. In this alternate embodiment, the prong arrangement 22 has the same number of prongs as sockets in the socket arrangement 20.

Figure 3:
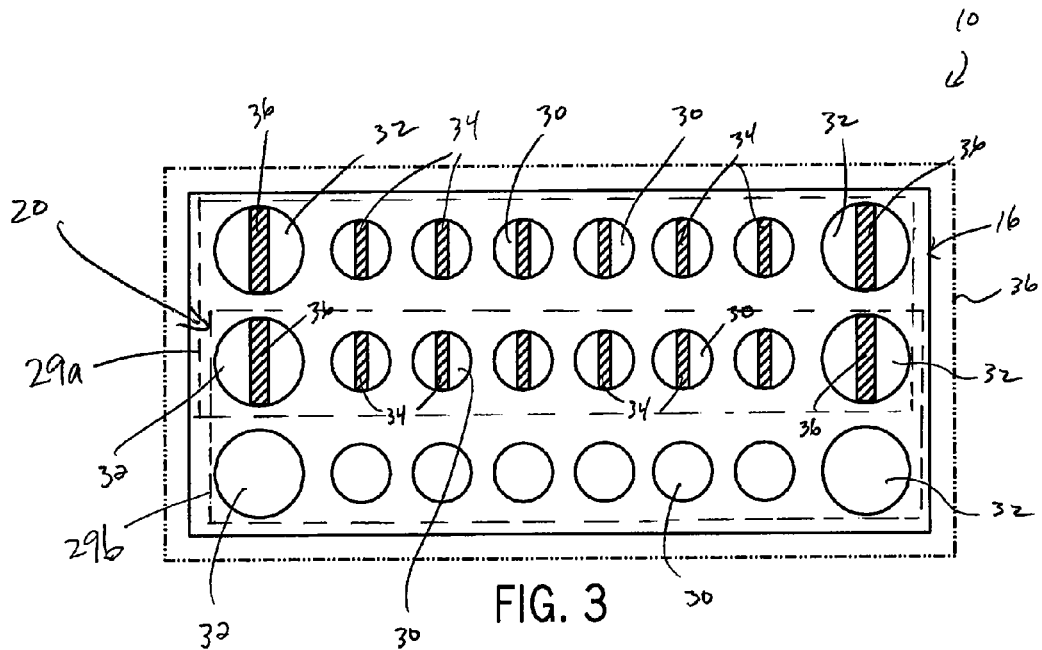
FIG. 3 is a cross-sectional view of the manual transfer-type switch shown in FIG. 1 with the plug seated in the plugboard in a first position.
Figure 4:
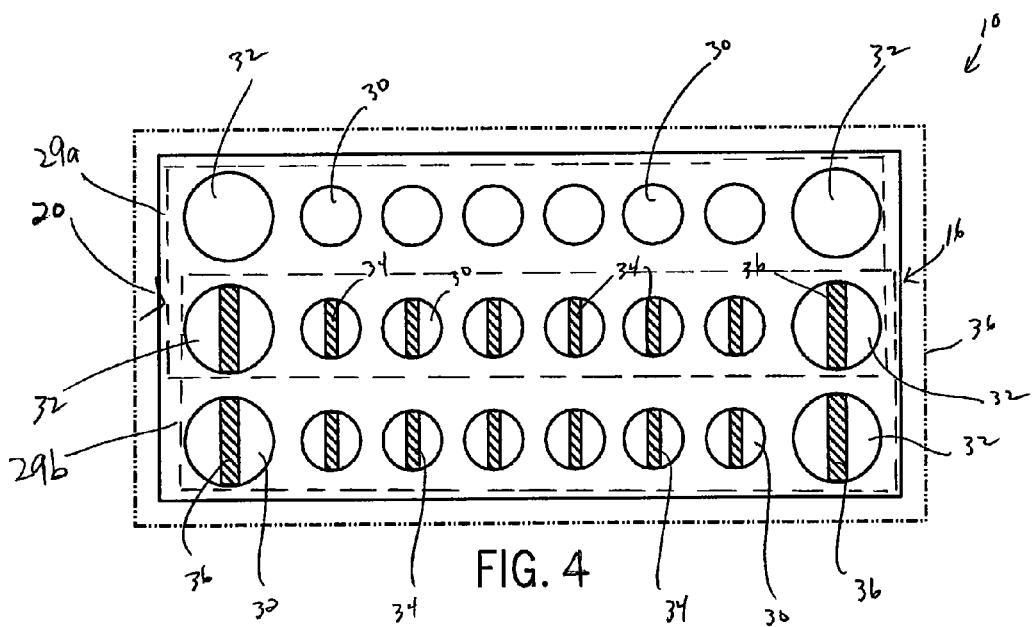
FIG. 4 is a cross-sectional view of the manual transfer-type switch shown in FIG. 1 with the plug seated in the plugboard in a second position.

The socket arrangement 20 is such that the plugboard 16 may receive the isolating plug 24 in two different orientations. In one orientation, as shown in FIG. 3, socket set 29a receives hot prongs 34 and neutral prongs 36. In this orientation, the lower row of hot sockets 30 and the lower neutral sockets 32 in socket set 29b do not receive a prong. The orientation shown in FIG. 3 corresponds to a primary power orientation. Accordingly, when the isolating plug 24 is seated in the plugboard 16 at the orientation shown in FIG. 3, the loads of the transfer switch 10 are connected to the primary power supply. On the other hand, when the isolating plug 24 is inserted into the plugboard 16 in a second orientation as shown in FIG. 4, socket set 29b receives hot prongs 34 and neutral prongs 36. In this orientation, the upper row of hot sockets 30 and the upper neutral sockets 32 in socket set 29a do not receive a prong. The orientation shown in FIG. 4 corresponds to an auxiliary power orientation. Accordingly, when the isolating plug 24 is seated in the plugboard 16 at the orientation shown in FIG. 4, the loads of the transfer switch 10 are connected to the auxiliary power supply, such as an electrical generator. As shown by a comparison of the orientations illustrated in FIGS. 3-4, the auxiliary power supply position of plug 24 (FIG. 4) is rotated 180 degrees from the primary power supply position (FIG. 3).

The face 37 of plug 24 may include identifiers that identify the position of the prongs 34, 36. Accordingly, when the plug 24 is seated in the plugboard 16, the orientation of the prongs may be easily determined. It is contemplated that other means may be used to provide a visual identification as to the orientation of the prongs when the plug is seated in the plugboard.

Figure 5:
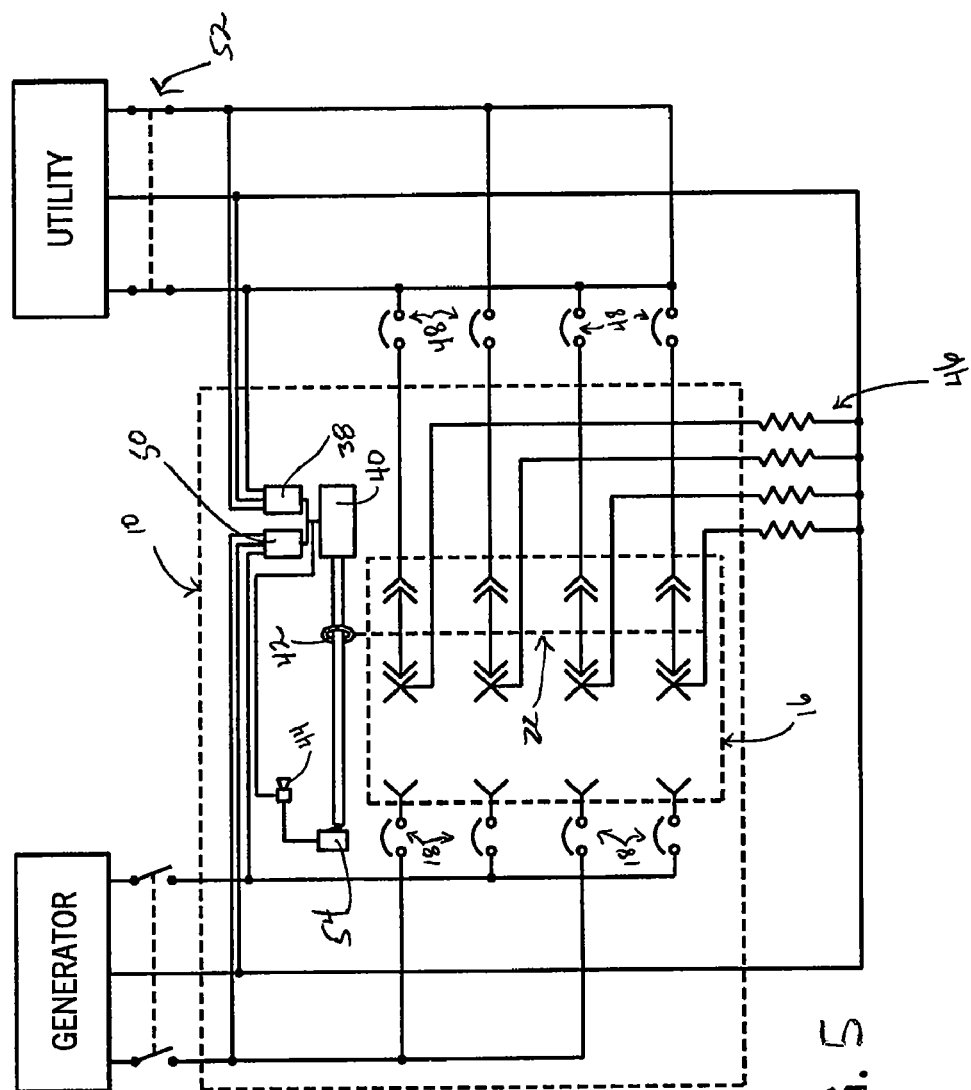
FIG. 5 is a simplified circuit diagram of the manual transfer-type switch with the plug seated in the plugboard in the position shown in FIG. 3.
Figure 6:
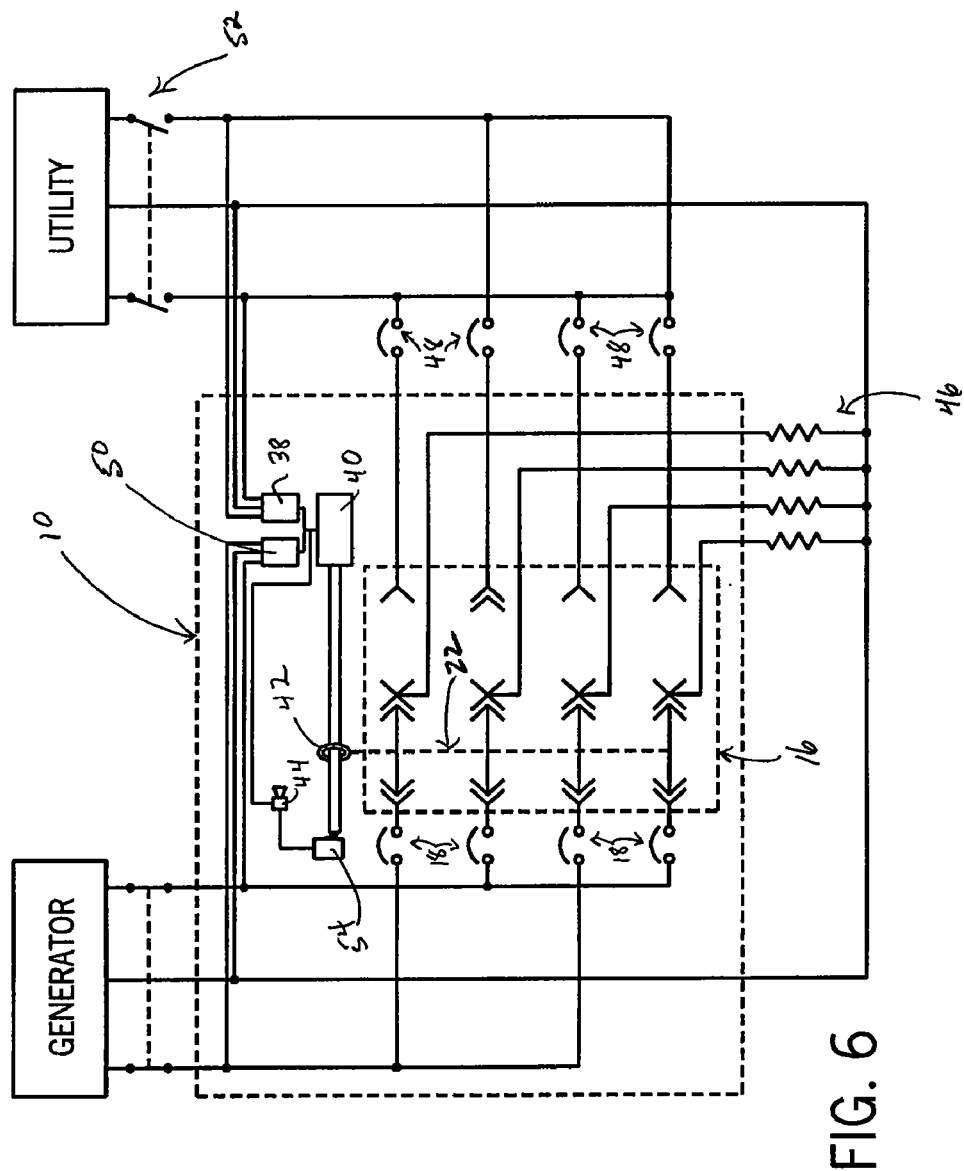
FIG. 6 is a simplified circuit diagram of the manual transfer-type switch with the plug seated in the plugboard in the position shown in FIG. 4.

Operation of the transfer switch 10 will now be described with respect to FIGS. 5-6. FIG. 5 is a circuit diagram corresponding to the isolating plug 24 seated in the plugboard 16 at the primary power position (FIG. 3) whereas FIG. 6 is a circuit diagram corresponding to the isolating plug 24 seated in the plugboard 16 at the auxiliary power position (FIG. 4).

When the isolating plug 24 is inserted into the plugboard 16 at the primary power position as shown in FIG. 5, a primary-side solenoid power supply 38 provides power to a solenoid 40 operably coupled to a locking feature 42 that locks the isolating plug 24 into the plugboard 16. Current can then flow from the primary power supply through the prongs 34 of the plug 24 and ultimately to the loads that are interconnected with the hot sockets 30 of socket set 29a. The solenoid 40 will remain energized as long as the primary-side power supply 38 is receiving power from the primary power supply, e.g., utility. Moreover, the locking feature 42 secures the isolating plug 24 in the plugboard 16 under the force imposed by the solenoid 40 thereby preventing removal of the isolating plug 24 from the plugboard 16 so long as power is being provided by the primary power supply. As such, an operator cannot remove the isolating plug 24 from the plugboard 16. To disconnect a load (representatively shown as resistors 46) that is powered by the primary power supply through the transfer switch 10, the load center circuit breaker 48 for the load 46 must be thrown to an OFF position. In this regard, the load center circuit breakers 48 perform current making and breaking, rather than the isolating plug 24 and plugboard 16.

When the utility power fails, the primary-side solenoid power supply 38 can no longer power the solenoid 40 to maintain the locking feature 42 in a position that locks the isolating plug 24. Thus, the isolating plug 24 can be removed manually by an operator. To connect the transfer switch to the auxiliary power supply, the operator rotates the isolating plug 24 180 degrees from the utility power position (FIG. 3) to the auxiliary power position (FIG. 4) and then reinserts the isolating plug 24, at the rotated orientation, into the plugboard 16 such that the prongs 34 are engaged with the hot sockets 30 of socket set 29b. FIG. 6 is a circuit diagram showing the circuit that is formed when the isolating plug 24 is inserted into the plugboard 16 at the auxiliary power position.

The operator can then energize the auxiliary or backup power supply and activate any of the branch circuit breakers 18 to selectively energize the loads 46 that are interconnected with the hot sockets 30 of socket set 29b. That is, current can be fed from the auxiliary power supply through the prongs 34 of the plug 26 to the loads. When the auxiliary power supply is operating, the solenoid 40 is powered by the auxiliary-side solenoid power supply 50 to maintain the locking feature 42 in a position that locks the isolating plug 24 into the plugboard 16.

When primary power is restored, both power supplies will be operative; however, because the isolating plug 24 is seated in the plugboard 16 at the auxiliary power supply position, primary power is not delivered to the loads 46. To reconnect the loads to primary power, both the primary and auxiliary power supplies must be deactivated or disconnected from the transfer switch, which causes the solenoid 40 to undergo a loss of power thereby removing the bias placed on the locking feature 42, which results in unlocking of the isolating plug 24. Once both power supplies have been deactivated, the isolating plug 24 may be removed from the plugboard 16, rotated to the primary power position, and reinserted into the plugboard 16.

Thereafter, the primary power supply may be reactivated by switching the main breaker 52 into the ON position, which causes primary power to not only be delivered to the loads 46, but also activates the solenoid 40 to bias the locking feature 42 so as to lock the isolating plug 24 into the plugboard 16.

Referring again to FIGS. 5-6, to ensure that the isolating plug 24 is fully inserted into the plugboard 16, at either the primary power position or the auxiliary power position, a proximity sensor 54 may be used to sense the position of the locking feature 42. In this regard, if the isolating plug 24 is not fully seated in the plugboard 16, a sonic 44 sounds an alarm to alert a user accordingly. When a fully seated position of the isolating plug 24 in the plugboard 16 is reached, the sonic 44 automatically silences the alarm.

Referring again to FIGS. 1-2, the manual transfer switch 10 may also have a lower faceplate 56 supporting a current and voltage meter 58, 60. The lower faceplate 56 may also include an access panel cover plate 62, as is known in the art. It is recognized that the manual transfer switch 10 may include additional meters, dials, control buttons, displays, and the like, as is known in the art.

It is understood that the drawings and the above description pertain to a representative embodiment of the present invention, and that various alternatives and modifications are possible and are contemplated as being within the scope of the present invention. For example, and without limitation, it is contemplated that the arrangement of prongs on the plug 26 and sockets on the plugboard 16 may be reversed, in that the plug 24 may carry sockets and the plugboard and 16 may have prongs with which the plugboard sockets may be engaged. It is also contemplated that the particular arrangement of the sockets in the plugs may take any desired, and are not limited to the linear arrangement as shown and described. It is also contemplated that any satisfactory type of locking mechanism may be employed to maintain the plug in engagement with the plugboard when power is supplied to the switch 10 from any source, and the locking mechanism is not limited to a solenoid-type arrangement as shown and described. It is preferable, however, that the locking arrangement be automatically responsive to the supply of power to the switch 10 from a power source, so that the locking arrangement is automatically actuated so as to secure the plug to the plugboard when power is supplied to the switch 10 and the plug is engaged with the plugboard.

The present invention has been described in terms of the preferred embodiment, and it is recognized that equivalents, alternatives, and modifications, aside from those expressly stated, are possible and within the scope of the impending claims.

What is claimed is:

1. A transfer-type switch comprising:
a first power input connected to a first power supply;
a second power input connected to a second power supply;
a movable interlock arrangement positioned between the first and second power inputs and that electrically isolates the first power supply and the second power supply from one another without performing making and breaking of current functions, wherein the movable interlock arrangement is selectively positionable in a first position for supplying power from the first power supply and in a second position for supplying power from the second power supply; and
wherein the interlock arrangement includes a plugboard and an isolating plug, wherein the plugboard and the isolating plug include:
a first set of sockets electrically connected to the first power supply;

a second set of sockets electrically connected to the second power supply; and a set of conductors;

wherein the plug may be positioned in the first position such that the conductors are engaged with the first set of sockets or may be positioned in the second position such that the conductors are engaged with the second set of sockets.

2. The switch of claim 1 wherein the plug has a handle for inserting and removing the plug from the plugboard, and wherein the handle is electrically isolated from the set of conductors.

3. The switch of claim 1 wherein the plug closes a circuit between the first power supply and a plurality of loads when positioned at the first position and closes a circuit between the second power supply and the plurality of loads when positioned at the second position.

4. The switch of claim 1 wherein the interlock arrangement includes a locking feature to selectively maintain the plug in a locked position when power is being provided to either one of the first and the second power inputs.

5. The switch of claim 4 wherein the locking feature comprises a solenoid that is powered by a solenoid power supply connected to the first power supply and the second power supply, and wherein the solenoid terminates biasing of the plug when power is not received from either one of the first power supply and the second power supply thereby allowing removal of the plug from the plug board.

6. The switch of claim 4 further comprising a sonic that is sounded if the plug is not fully seated in the plugboard.

7. The switch of claim 1 wherein the first position is rotated 180 degrees from the second position.

8. The switch of claim 1 wherein the conductors are composed of brass.

9. The switch of claim 1 wherein the first power supply is a utility power supply and the second power supply is a generator power supply.

10. A transfer-type switch comprising:

a plugboard and removable plug, the plugboard and plug constructed such that engagement of the plug with the plugboard in a first position connects a load to a first power supply and engagement of the plug with the plugboard in a second position connects the load to a second power supply; and a locking arrangement that locks the plug to the plugboard when the plug is engaged with the plugboard and power is supplied to the plugboard from either the first power supply or the second power supply.

11. The switch of claim 10 wherein the locking arrangement comprises a solenoid, and further including a first solenoid power supply and a second solenoid power supply, wherein the first solenoid power supply is connected to the first power supply and the second solenoid power supply is connected to the second power supply.

12. The switch of claim 11 wherein the solenoid only biases the locking arrangement when the first solenoid power supply is receiving power from the first power supply or when the second solenoid power supply is receiving power from the second power supply.

13. The switch of claim 10 further comprising a sensor that determines a position of the locking arrangement to determine whether the plug is fully engaged with the plugboard.

14. The switch of claim 13 further comprising a sensory alert that is actuated if the sensor determines that the plug is not fully engaged with the plugboard.

15. The switch of claim 10 wherein the plugboard comprises a first set of sockets electrically connected to the first power supply, a second set of sockets electrically connected to the second power supply, and a third set of sockets engaged with one or more electrical loads, wherein the plug comprises a set of conductors that, when positioned at the first position are engaged with the first and third sets of sockets, and, when positioned at the second position are engaged with the second and third sets of sockets.

16. The switch of claim 15 wherein the conductors are composed of brass.

17. The switch of claim 10 wherein the first position is rotated 180 degrees from the second position.

18. The switch of claim 10 wherein the first power supply is a utility power supply and the second power supply is a generator power supply.

19. A method of supplying electrical power to one or more loads from either in a first power source or a second power source, comprising the acts of:

supplying power to the one or more loads from the first power supply through a switch arrangement that includes a removable plug member engaged with the switch arrangement in a first position;

removing the plug member from the switch arrangement when power from the first powered supply is interrupted;

engaging the plug member with the switch arrangement in a second position distinct from the first position, wherein engagement of the plug member with the switch arrangement in the second position isolates the electrical loads from the first power supply; and supplying power to the one or more loads from the second power supply through the switch arrangement and the plug member in the second position.

20. The method of claim 19, further comprising the act of preventing disengagement of the plug member from the switch arrangement when power is supplied to the switch arrangement from either the first power supply or the second power supply.

21. The method of claim 20, wherein the act of preventing disengagement of the plug member from the switch arrangement is carried out by an electrically operated actuator that secures the plug member to the switch arrangement when power is supplied to the switch arrangement from either the first power supply or the second power supply.

* * * * *